(12) United States Patent
Kozuch et al.

(10) Patent No.: US 7,225,441 B2
(45) Date of Patent: May 29, 2007

(54) MECHANISM FOR PROVIDING POWER MANAGEMENT THROUGH VIRTUALIZATION

(75) Inventors: Michael Kozuch, Beaverton, OR (US); Stephen Chou, North Plainfield, NJ (US); Erik Cota-Robles, Portland, OR (US); Stalinselvaraj Jeyasingh, Portland, OR (US); Alain Kagi, Portland, OR (US); Gilbert Neiger, Portland, OR (US); Sebastian Schoenberg, Dresden (DE); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 09/752,586

(22) Filed: Dec. 27, 2000

(65) Prior Publication Data

US 2002/0083110 A1    Jun. 27, 2002

(51) Int. Cl.
*G06F 9/455* (2006.01)
*G06F 1/26* (2006.01)
*G06F 15/173* (2006.01)

(52) U.S. Cl. .................. 718/1; 713/300; 713/320; 713/323; 713/340; 709/223; 709/226

(58) Field of Classification Search ............ 718/1–108; 712/1; 713/300–340; 709/223–226
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,403,283 A | 9/1983 | Myntti et al. | |
| 4,419,724 A | 12/1983 | Branigin et al. | |
| 4,430,709 A | 2/1984 | Schleupen | |
| 4,571,672 A | 2/1986 | Hatada et al. | |

(Continued)

FOREIGN PATENT DOCUMENTS

DE    42177444 A1    12/1992

(Continued)

OTHER PUBLICATIONS

Benini et al., "Policy Optimization for Dynamic Power Management", IEEE, 1999, pp. 813-833.*

(Continued)

*Primary Examiner*—Lewis A. Bullock, Jr.
*Assistant Examiner*—Jennifer N. To
(74) *Attorney, Agent, or Firm*—Derek J. Reynolds (57) ABSTRACT

In one embodiment, a method for providing power management via virtualization includes monitoring the utilization of a host platform device by one or more virtual machines and managing power consumption of the host platform device based on the results of monitoring.

31 Claims, 5 Drawing Sheets

U.S. PATENT DOCUMENTS

| | | | |
|---|---|---|---|
| 4,621,318 A | 11/1986 | Maeda | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,079,737 A | 1/1992 | Hackbarth | |
| 5,187,802 A | 2/1993 | Inoue et al. | |
| 5,230,069 A | 7/1993 | Brelsford et al. | |
| 5,237,616 A | 8/1993 | Abraham et al. | |
| 5,287,363 A | 2/1994 | Wolf et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,469,557 A | 11/1995 | Salt et al. | |
| 5,504,922 A | 4/1996 | Seki et la. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,566,323 A | 10/1996 | Ugon | |
| 5,574,936 A | 11/1996 | Ryba et al. | |
| 5,582,717 A | 12/1996 | Di Santo | |
| 5,590,342 A * | 12/1996 | Marisetty | 713/324 |
| 5,604,805 A | 2/1997 | Brands | |
| 5,606,617 A | 2/1997 | Brands | |
| 5,628,022 A | 5/1997 | Ueno et al. | |
| 5,633,929 A | 5/1997 | Kaliski, Jr. | |
| 5,668,971 A | 9/1997 | Neufeld | |
| 5,684,948 A | 11/1997 | Johnson et al. | |
| 5,706,469 A | 1/1998 | Kobayashi | |
| 5,720,609 A | 2/1998 | Pfefferle | |
| 5,721,222 A | 2/1998 | Bernstein et al. | |
| 5,737,604 A | 4/1998 | Miller et al. | |
| 5,737,760 A | 4/1998 | Grimmer, Jr. et al. | |
| 5,740,178 A | 4/1998 | Jacks et al. | |
| 5,752,046 A * | 5/1998 | Oprescu et al. | 713/300 |
| 5,757,604 A | 5/1998 | Bennett et al. | |
| 5,757,919 A | 5/1998 | Herbert et al. | |
| 5,784,628 A * | 7/1998 | Reneris | 713/300 |
| 5,796,835 A | 8/1998 | Saada | |
| 5,809,546 A | 9/1998 | Greenstein et al. | |
| 5,825,875 A | 10/1998 | Ugon | |
| 5,825,880 A | 10/1998 | Sudia et al. | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,944,821 A | 8/1999 | Angelo | |
| 5,953,502 A | 9/1999 | Helbig, Sr. | |
| 5,953,536 A * | 9/1999 | Nowlin, Jr. | 713/323 |
| 5,956,408 A | 9/1999 | Arnold | |
| 5,970,147 A | 10/1999 | Davis | |
| 5,978,475 A | 11/1999 | Schneier et al. | |
| 6,035,374 A | 3/2000 | Panwar et al. | |
| 6,044,478 A | 3/2000 | Green | |
| 6,055,637 A | 4/2000 | Hudson et al. | |
| 6,061,794 A | 5/2000 | Angelo et al. | |
| 6,075,938 A | 6/2000 | Bugnion et al. | |
| 6,085,296 A | 7/2000 | Karkhanis | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A * | 10/2000 | Wong-Insley | 713/300 |
| 6,148,379 A | 11/2000 | Schimmel | |
| 6,173,417 B1 | 1/2001 | Merrill | |
| 6,175,924 B1 | 1/2001 | Arnold | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,212,635 B1 | 4/2001 | Reardon | |
| 6,222,923 B1 | 4/2001 | Schwenk | |
| 6,249,872 B1 | 6/2001 | Wildgrube et al. | |
| 6,252,650 B1 | 6/2001 | Nakamura | |
| 6,269,392 B1 | 7/2001 | Cotichini et al. | |
| 6,272,533 B1 | 8/2001 | Browne | |
| 6,272,637 B1 | 8/2001 | Little et al. | |
| 6,275,933 B1 | 8/2001 | Fine et al. | |
| 6,282,650 B1 | 8/2001 | Davis | |
| 6,292,874 B1 | 9/2001 | Barnett | |
| 6,301,646 B1 | 10/2001 | Hostetter et al. | |
| 6,308,270 B1 | 10/2001 | Guthery | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams et al. | |
| 6,374,286 B1 | 4/2002 | Gee et al. | |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 * | 5/2002 | Devine et al. | 718/1 |
| 6,397,379 B1 | 5/2002 | Yates et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |

| | | | |
|---|---|---|---|
| 6,763,454 B2* | 7/2004 | Wilson et al. ................. | 713/1 |
| 6,901,522 B2* | 5/2005 | Buch ......................... | 713/320 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2002/0007456 A1 | 1/2002 | Peinado et al. | |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | |
|---|---|---|
| EP | 0473913 | 3/1992 |
| EP | 0600112 A1 | 6/1994 |
| EP | 0602867 | 6/1994 |
| EP | 0 892 521 A2 | 1/1999 |
| EP | 0930567 A3 | 7/1999 |
| EP | 0 965 902 A2 | 12/1999 |
| EP | 0961193 | 12/1999 |
| EP | 1030237 A1 | 8/2000 |
| EP | 1 055 989 A1 | 11/2000 |
| EP | 1 056 014 A1 | 11/2000 |
| EP | 1 085 396 A1 | 3/2001 |
| EP | 1146715 A1 | 10/2001 |
| EP | 1209563 | 5/2002 |
| EP | 1 271 777 A2 | 1/2003 |
| JP | 76139 A0 | 3/2000 |
| WO | WO 95/24696 A2 | 9/1995 |
| WO | WO 98/12620 | 9/1996 |
| WO | WO 97/29567 A1 | 8/1997 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO 99/18511 A1 | 4/1999 |
| WO | WO 99/57863 | 11/1999 |
| WO | WO 99/65579 A1 | 12/1999 |
| WO | WO-0021238 | 4/2000 |
| WO | WO 00/62232 | 10/2000 |
| WO | WO 01/27723 A2 | 4/2001 |
| WO | WO 01/27821 A2 | 4/2001 |
| WO | WO 01/63994 A2 | 8/2001 |
| WO | WO 01 75564 | 10/2001 |
| WO | WO 01/75565 A2 | 10/2001 |
| WO | WO 01/75595 A2 | 10/2001 |
| WO | WO 02/01794 A2 | 1/2002 |
| WO | WO 02 17555 | 2/2002 |
| WO | WO 02/060121 A1 | 8/2002 |
| WO | WO 02 086684 | 10/2002 |
| WO | WO 03/058412 A2 | 7/2003 |

OTHER PUBLICATIONS

Berg, Cliff, "How Do I Create A Signed Applet?" Dr. Dobb's Journal, Aug. 1997, pp. 1-9.

Goldberg, Robert P., "Survey of Virtual Machine Research," IEEE Computer Magazine vol. 7, No. 6, pp. 34-35, 1974.

Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.

Gum, P.H., "System/370 Extended Architecture: Facilities for Virtual Machines," IBM J. Research Development, vol. 27, No. 6, pp. 530-544, Nov. 1983.

Heinrich, J., "MIPS R4000 Microprocessor User's Manual," Second Edition, Chapter 4: Memory Management, pp. 67-79.

Intel Corporation, Intel386™ DX Microprocessor, 32-Bit CHMOS Microprocessor With Integrated Memory Management, 56 pages, Dec. 1995.

Lawton, K., "Running Multiple Operation Systems Concurrently On An IA32 PC Using Virtualization Techniques," http://www.plex86.org/research/paper.txt., pp. 1-31, downloaded Aug. 9, 2001.

Motorola, M68040 User's Manual (Including the MC68040, MC68040V, MC68LC040, MC68EC040, and MC68EC040V), Revised 1993.

Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.

Heinrich, J., "MIPS R4000 Microprocessor User's Manual," Chapter 4, Memory Management, pp. 61-67, 1993.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

IBM Technical Disclosure Bulletin, "Information Display Technique For a Terminate Stay Resident Program," vol. 34, Issue No. 7A, pp. 156-158. Dec. 1, 1991.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Kashiwagi, Kazuhiko, et al., "Design and Implementation of Dynamically Reconstructing System Software," Software Engineering Conference, 1996 Asia Pacific Seoul, South Korea, IEEE Comput. Soc. Dec. 4, 1996, pp. 278-287.

PCT Search Report dated Jul. 29, 2003 (U.S. Patent No. '075 Previously cited).

PCT Search Report dated Jul. 22, 2003.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Brands, Stefan , "Restrictive Blinding of Secret-Key Certificates", *Springer-Verlag XP002201306*, (1995), Chapter 3.

Davida, George I., et al., "Defending Systems Against Viruses through Cryptographic Authentication", *Poceedings of the Symposium on Security and Privacy*, IEEE Comp. Soc. Press, ISBN 0-8186-1939-2, (May 1989).

Intel, "IA-32 Intel Architecture Software Developer's Manual", vol. 3: *System Programming Guide*, Intel Corporation—2003, 13-1 through 13-24.

Luke, Jahn , et al., "Replacement Strategy for Aging Avionics Computers", *IEEE AES Systems Magazine*, XP002190614, (Mar. 1999).

Menezes, Oorschot , "Handbook of Applied Cryptography", *CRC Press LLC*, USA XP002201307, (1997), 475.

Richt, Stefan , et al., "In-Circuit-Emulator Wird Echtzeittaughlich", *Elektronic Franzis Verlag GMBH*, Munchen, DE, vol. 40, No. 16, XP 000259620, (100-103), Aug. 6, 1991.

Saez, Sergio , et al., "A Hardware Scheduler for Complex Real-time Systems", *Proceedings of the IEEE International Symposium on Industrial Electronics*, XP0002190615, (Jul. 1999), 43-48.

Sherwood, Timothy , et al., "Patchable Instruction ROM Architecture", *Department of Computer Science and Engineering, University of California*, San Diego, La Jolla, CA, (Nov. 2001).

IBM Corporation, "IBM ThinkPad T30 Notebooks", IBM Product Specification, located at www-1.ibm.com/services/files/cisco_t30_spec_sheet_070202.pdf, pp. 1-6 (Jul. 2, 2002).

Intel Corporation," Intel 82802AB/82802AC Firmware Hub (FWH)", Intel Product Datasheet, Document No. 290658-004, pp. 17-28 (Nov. 2000).

Intel Corporation, "IA-64 System Abstraction Layer Specification", Intel Product Specification, Order No. 245359-001, 112 pages, Jan. 2000.

Intel Corporation, "Intel IA-64 Architecture Software Developer's Manual—vol. 2: IA-64 System Architecture", Intel Product Manual, Order No. 245318-001, pp. i, ii, 5.1-5.3, 11.1-11.8, 11.23-11.26, Jan. 2000.

Menezes, Alfred J., et al., "Handbook of Applied Cryptography", CRC Press Series on Discrete Mathematics and its Applications, Boca Raton, FL, ISBN 0849385237, pp. 403-405, 506-515, 570 (Oct. 1996).

Nanba, S. et al., "VM/4: ACOS-4 Virtual Machine Architecture", IEEE Proceedings of the 12th Annual Symposium on Computer Architecture, pp. 171-178 (Jun. 1985).

RSA Security Inc., "Hardware Authenticators", located at www.rsasecurity.com/node.asp?id=1158, pp. 1-2 (2004).

RSA Security Inc., "Software Authenticators", located at www.rsasecurity.com/node.asp?id =1313, pp. 1-2 (2004).

RSA Security Inc., "RSA SecurID Authenticators", located at www.rsasecurity.com/products/securid/datasheets/SID_DS_0103.pdf, pp. 1-2 (2003).

Schneier, B., "Applied Cryptography: Protocols, Algorithm, and Source Code in C", 2nd Edition, Wiley, John & Sons, Inc., ISBN 0471117099 (hardcover printing), pp. 47-52, 56-65, 169-187 (Oct. 1995).

Schneier, B., "Applied Crytography: Protocols, Algorithm, and Source Code in C", 2nd Edition, Wiley, John & Sons, Inc., ISBN 0471128457 (softcover printing), pp. 28-33, 176-177, 216-217, 461-473, 518-522 (Nov. 1995).

Coulorouris, G. et al., "Distributed Systems: Concepts and Design", 2nd Edition, Addison-Wesley Publishers Ltd., Essex England, pp. 422-424 (1994).

Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).

Fabry, R.S., "Capability-Based Addressing", Communications of the ACM, vol. 17, No. 7, pp. 403-412 (Jul. 1974).

Frieder, G., "The Architecture and Operational Characteristics of the VMX Host Machine", IEEE Proceedings of the 15th Annual Workshop on Microprogramming, pp. 9-16, (Oct. 5, 1982).

Hewlett Packard Company, "Mobile Security Overview", pp. 1-9, (Sep. 2002).

Hall, J., et al.: "Virtualizing the VAX Architecture" Computer Architecture News, vol. 19, pp. 380-389, (May 1991).

Intel, "IA-32 Intel Architecture Software Developer's Manual," *vol. 3 System Programming Guide*, Intel Corporation - 2003, 13-1 through 13-24.

* cited by examiner

MECHANISM FOR PROVIDING POWER MANAGEMENT THROUGH VIRTUALIZATION

FIELD OF THE INVENTION

The present invention relates generally to virtual machines, and more specifically to providing power management via a virtual machine monitor.

BACKGROUND OF THE INVENTION

A conventional virtual machine monitor (VMM) runs on a computer, hereafter called the "host platform", and presents to other software the abstraction of one or more virtual machines (VMs). Each VM functions as a self-contained computer, running its own "guest operating system" (guest OS), which can be a standard OS for the computer being virtualized (e.g., Microsoft® Windows® for a Personal Computer). Currently, each guest OS is responsible for solving power management problems. However, some OSes are unable to manage the power consumed by the host platform because they are not equipped to handle power-management signals sent by host platform hardware. In addition, the guest OS expects to run on a dedicated computer rather than in a VM and is unaware of other VMs that may be running on the same host platform. As a result the guest OS may, in its attempts to provide power management of the VM that it is running in, conflict with the power management actions or expectations of other guest OSes running in other VMs. Accordingly, guest OSes running in multiple VMs cannot be allowed to directly provide power management of host platform hardware resources.

Therefore, there is a need for an alternative power management mechanism that will provide more efficient use of computing resources in a virtual machine environment.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE EMBODIMENTS

A method and apparatus for providing power management via virtualization are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Figure 1:
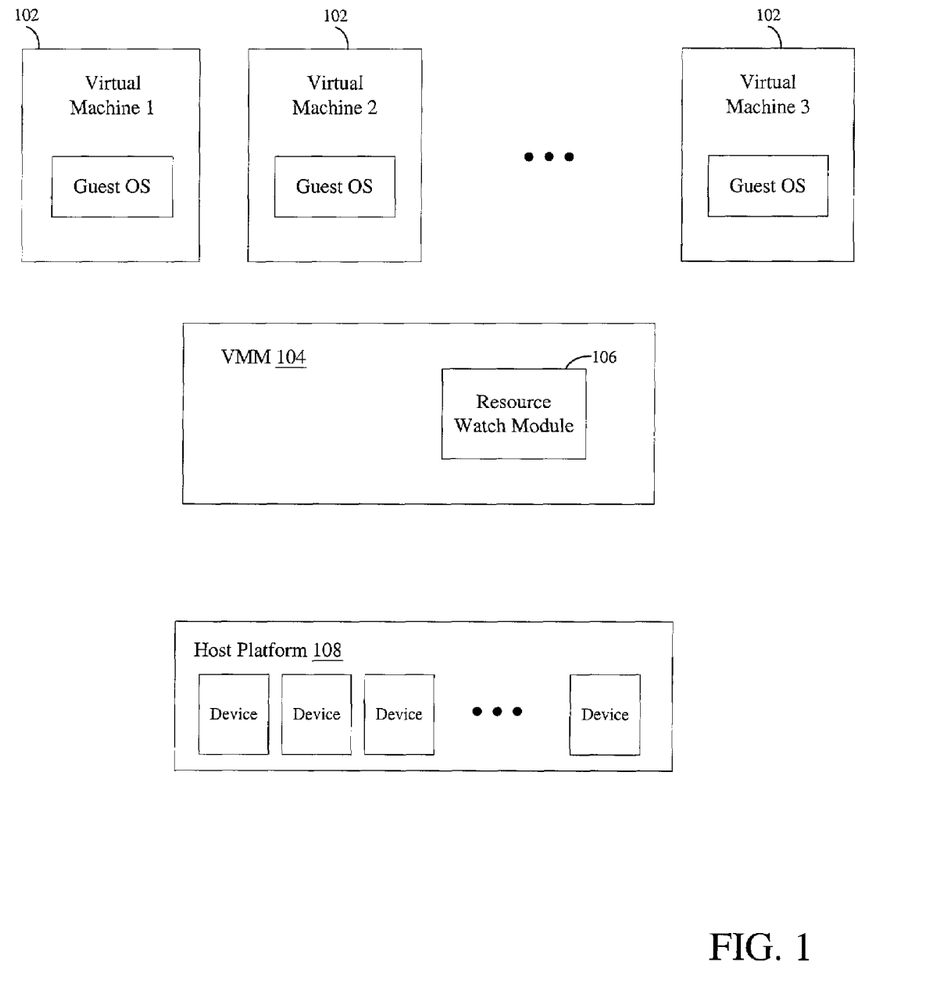
FIG. 1 is a block diagram of a system for providing power management via virtualization, according to one embodiment of the present invention.

The method and apparatus of the present invention provide a power management mechanism that can be used in a virtual machine environment. FIG. 1 illustrates a system 100 for providing power management via virtualization, according to one embodiment of the present invention. In this embodiment, host platform 108 is a computing platform that comprises electronic hardware. In one embodiment, the electronic hardware consists of one or more power-manageable devices. These power-manageable devices may include, for example, a disk drive, a processor, or any other device capable of operating in a mode other than ON and OFF modes. For instance, a disk drive may be commanded to enter a sleep state in which the platters stop rotating, or a processor may be commanded to enter one of several power-consumption modes. The power consumption of the processor may be reduced by simultaneously reducing the voltage and frequency supplied, although other mechanisms for reducing the power consumption of the processor may be employed. In another embodiment, the host platform 108 also includes non-power-manageable devices. Such devices can typically operate either in ON mode or OFF mode and do not have a reduced power-consumption state.

The host platform 108 is capable of executing a virtual machine monitor (VMM) 104. The VMM 104, though typically implemented in software, exports a bare machine interface to higher level software. The interface exported by VMM 104 to the multiple VMs 102 may mirror the actual platform, so that it is virtualized, or it may differ in some or all respects so that a different platform is emulated. Such higher level software may comprise a standard or real-time OS, although the invention is not limited in scope in this respect and, alternatively, for example, the VMM 104 may be run within, or on top of, another VMM. VMMs and their typical features and functionality are well-known by those skilled in the art and may be implemented, for example, in software, firmware or by a combination of various techniques.

As described above, the VMM 104 presents to other software (i.e., "guest" software) the abstraction of one or more virtual machines (VMs). FIG. 1 shows multiple VMs 102. Each VM 102 runs its own guest operating system (guest OS). In one embodiment, all guest OSes are capable of handling power-management signals sent by the host platform 108. In another embodiment, none of the guest OSes in the system 100 is capable of handling such signals. For instance, if the guest OS was developed before power-management features were added to a particular device or class of devices, said guest OS would not typically be able to adjust the power setting of that device. In yet another embodiment, one or more VMs 102 run guest OSs that have the capacity of handling the power-manageable signals and the remaining VMs 102 run guest OSs that lack such capacity.

The guest OS is provided with the illusion of executing on the host platform, rather than in a virtual platform. In one embodiment, the virtual abstraction presented to the guest OS matches the characteristics of the host platform 108. Alternatively, the virtual abstraction presented to the guest OS differs from the characteristics of the host platform 108.

The VMM 104 provides protection between VMs 102 and observes the activities of the VMs 102. In one embodiment, the VMM 104 includes a resource watch module 106 which monitors utilization of host platform devices by the VMs 102 and provides input pertaining to the allocation of the host resources to the VMM 104. Based on this input, the VMM 104 manages power consumption of physical devices within the host platform 108. For instance, the resource watch module 106 may determine that a particular power-manageable device is not being utilized and provide this information to the VMM 104. The VMM 104 may then place this device in a reduced power-consumption state.

In one embodiment, the resource watch module 106 observes utilization of host platform devices whenever any VM 102 is started or stopped. In one embodiment, the resource watch module 106 determines that the VM 102 executes an application that does not require a certain device (e.g., a display device). The resource watch module 106 notifies the VMM 104 about this determination. The VMM 104 then provides to the corresponding guest OS only the abstraction of the remaining host platform devices rather than the entire host platform 108. In another embodiment, if the resource watch module 106 determines that the resources of a particular platform device have not been allocated to any of the VMs 102, the VMM 104 commands this device to enter a reduced power-consumption mode.

Figure 2:
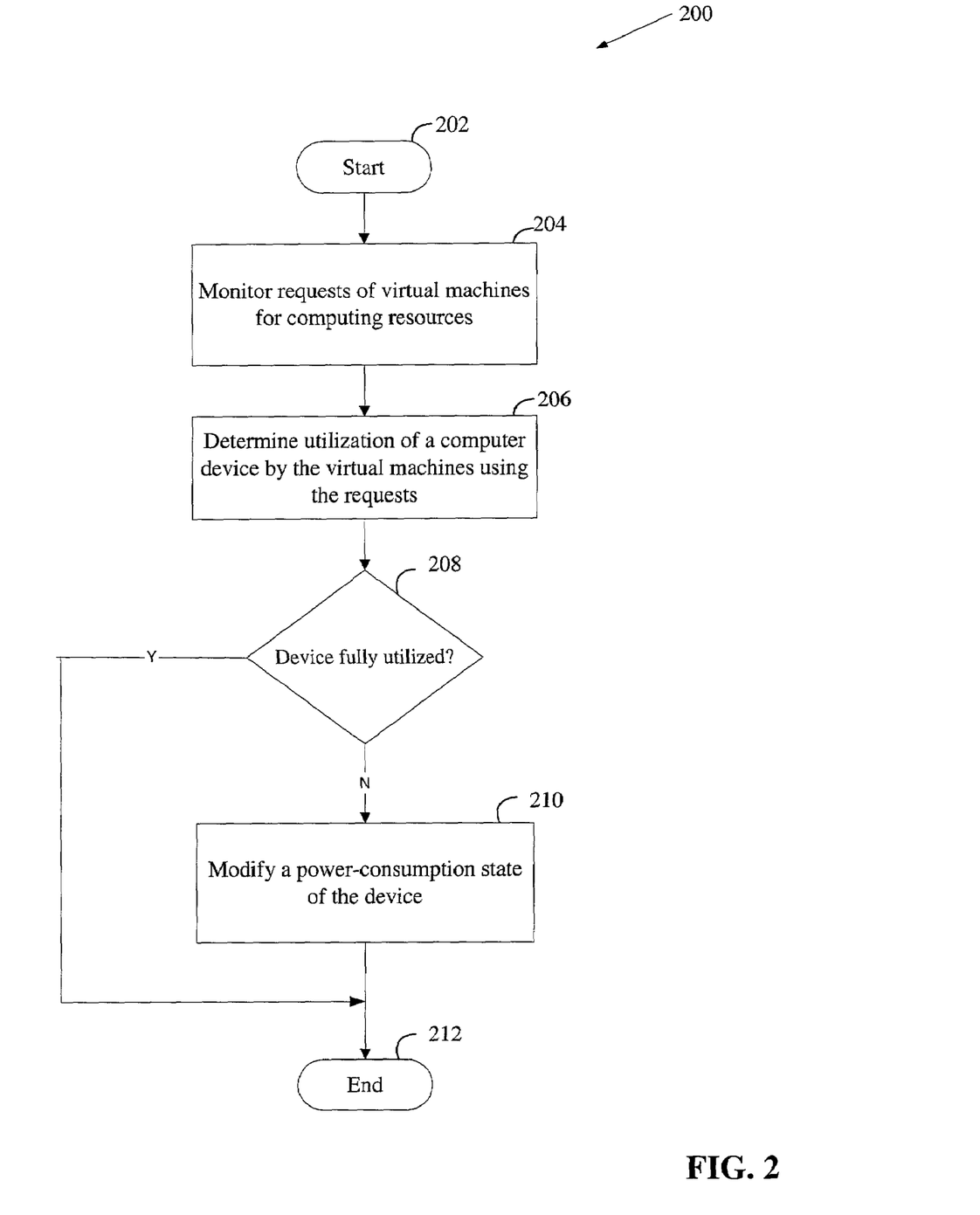
FIG. 2 is a flow diagram of a method for providing power management, according to one embodiment of the present invention.

In an alternative embodiment, the resource watch module 106 constantly monitors the utilization of the host platform devices by the VMs 102. This embodiment is referred to herein as a dynamic power management of the host platform 108. FIG. 2 is a flow diagram of a method 200 for providing dynamic power management, according to one embodiment of the present invention.

Referring to FIG. 2, method 200 begins with monitoring requests for computing resources of a host platform. The resource requests are initiated by one or more VMs. At processing block 206, the utilization of a host platform device is determined using the requests of one or more VMs for computing resources. In one embodiment, the utilization of the device by the VMs is determined by identifying a change in the operation of one or more VMs and deciding whether the change in the operation will affect the utilization of the device.

At decision box 208, a determination is made as to whether the device is fully utilized. If the determination is positive, i.e., the VMs fully utilize the capacity of the device, then the power-consumption state of the device remains unchanged. Otherwise, the power-consumption state of the device is modified (processing block 210). For instance, if the determination is made that the device is under-utilized, the device is placed in a reduced power-consumption state. Alternatively, the power-consumption state of the device may be modified to allocate more resources of the device to the VMs.

In one embodiment, the VMM notifies one or more VMs that support such a notification about the modification of the power-consumption state of the device. For those VMs that do not support the notification, the guest OSs may experience longer latencies when accessing the device that has been placed in a reduced power-consumption state.

Figure 3:
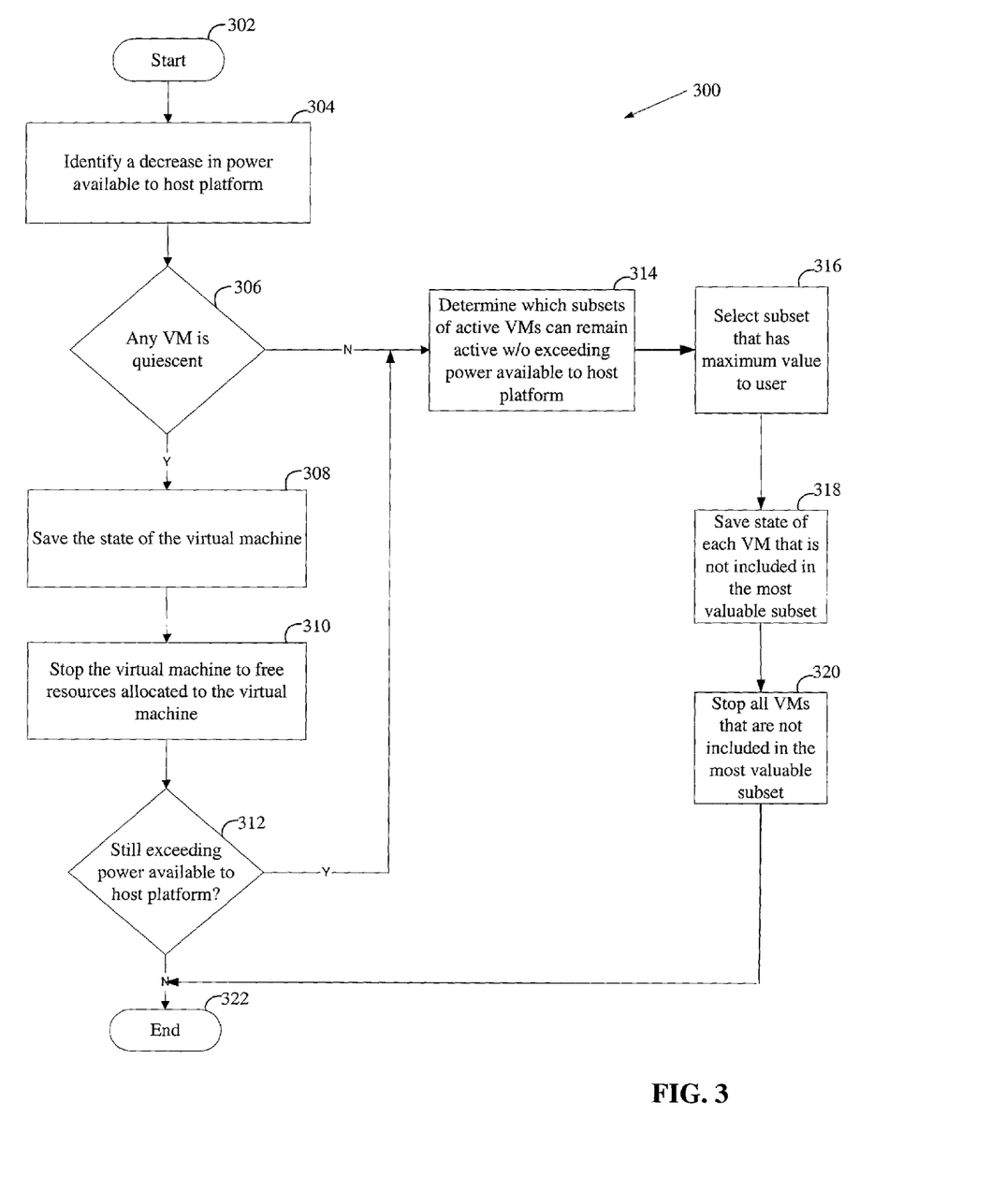
FIG. 3 is a flow diagram of a method for reducing resource requirements of virtual machines, according to one embodiment of the present invention.

FIG. 3 is a flow diagram of a method 300 for reducing resource requirements of VMs, according to one embodiment of the present invention. In this embodiment, if the power available to the host platform decreases, method 300 allows reducing the resource requirements of VMs by stopping one or more VMs that are not being used.

Referring to FIG. 3, method 300 begins with identifying a decrease in the power available to the host platform (processing block 304). For instance, the decrease may occur because the host platform is reduced from AC power and is now running on battery power. At decision box 306, a determination is made as to whether any of the VMs is quiescent. If the determination is positive, i.e., a quiescent VM is found, the VMM then saves the current state information of this VM (processing block 308) and stops this VM (processing block 310). As a result, the resources allocated to the VM are freed. The VMM may then reduce the power consumption of one or more devices which were partially or fully allocated to the saved VM, thereby adjusting to the decrease in the available power. If more than one quiescent VMs are found, the VMM may save and stop as many of these quiescent VMs as necessary to avoid exceeding the power available to the host platform. Then, at decision box 312, a determination is made as to whether the VMs that remain active still exceed the power available to the host platform. If the determination is negative, method 300 stops. Otherwise, method 300 proceeds to processing block 314.

If either the determination made at decision box 306 is negative (i.e., none of the VMs is quiescent) or the determination made at decision box 312 is positive (i.e., after one or more quiescent VMs have been stopped, the remaining VMs still exceed the power available to the host platform), then the active VMs are examined. In particular, at processing box 314, the VMM determines which subsets of the active VMs can remain active without exceeding the power available to the host platform. For instance, the VMM may make this determination by evaluating all possible combinations of the active VMs and determining these VMs' resource requirements. Each subset of VMs may contain one or more VMs; in addition the empty set (i.e., the set of no VMs) may be included to guarantee that there is at least one subset of VMs does not exceed the power available to the host platform.

Next, at processing box 316, the VMM selects the subset that has the most value to the user from the subsets of VMs identified at processing block 314 using a policy pertaining to user preferences with respect to the VMs. In one embodiment, the policy pertaining to user preferences is predetermined (e.g., defined by the computer manufacturer). Alternatively, the user is provided with an opportunity to specify his or her desired policy regarding the VMs. For instance, the user may specify the desired policy in advance (i.e., statically) or at the time the most valuable subset of VMs is being selected (i.e., dynamically). In one embodiment, the user's desired policy regarding a particular VM is maintained by an application (e.g., a resource management application) running in this VM. The application can then communicate this policy to the VMM at any appropriate point of time.

Further, all the active VMs other than the VMs selected at processing block 316 are saved and stopped. That is, the states of these VMs are saved (processing block 318) and the VMs are stopped to free the resources allocated to these VMs (processing block 320).

Subsequently, when any of the VMs that were stopped becomes active, the VMM restores the state of this VM using the saved state information. Accordingly, the VMM is able to balance between resource requirements of multiple VMs and available resources of the host platform.

Figure 4:
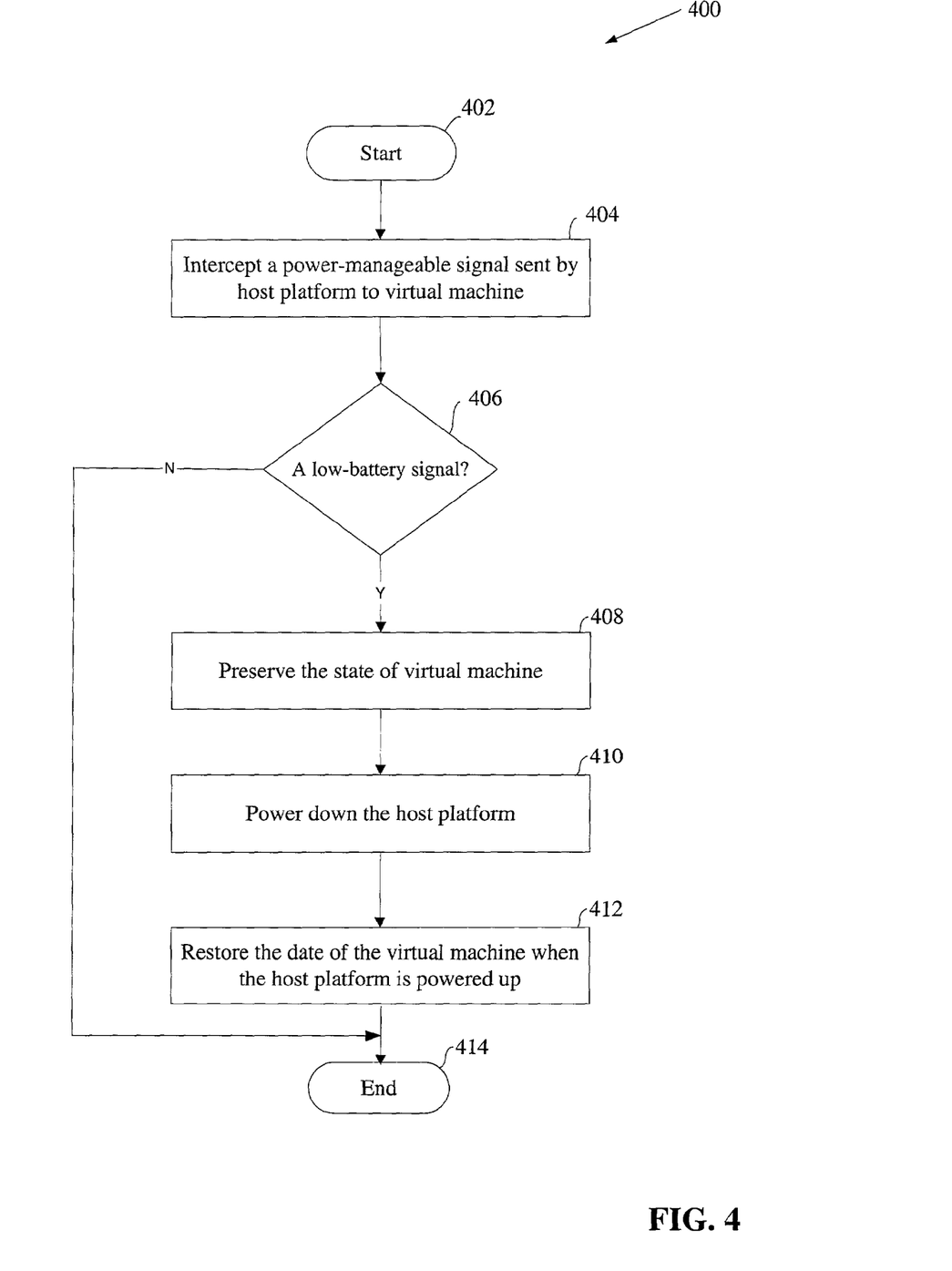
FIG. 4 is a flow diagram of a method for assisting a guest operating system, according to one embodiment of the present invention.

FIG. 4 is a flow diagram of a method 400 for assisting a guest OS that is not aware of power-management, according to one embodiment of the present invention. As described above, some guest OSs may not be equipped to handle power-manageable signals sent by the host platform. These guest OSs are referred to herein as non-power-management-aware guest OSs. In one embodiment, the VMM assists such guest OSs by intercepting the power-management signals sent by the host platform and preserving the state of the corresponding VM when necessary. Method 400 illustrates this embodiment of the present invention using an exemplary scenario of low battery. It should be noted that method 400 should not be limited to this particular scenario and may be used to assist the guest OS in various other situations without loss of generality.

Method 400 begins with intercepting a power-management signal sent to the VM that runs a non-power-management-aware guest OS (processing block 404). At decision box 406, a determination is made as to whether this signal indicates that the battery used for the host platform is low. If the determination is negative, the VMM takes no actions, and method 400 ends.

Alternatively, if the determination is positive, the VMM saves the state information of the VM (processing block 408) and powers down the host platform (processing block 410). Subsequently, when the host platform is powered up, the VMM restores the state of the VM using the saved state information. Accordingly, the VMM prevents the non-power-management-aware guest OS from losing data during the power-down state of the host platform.

Figure 5:
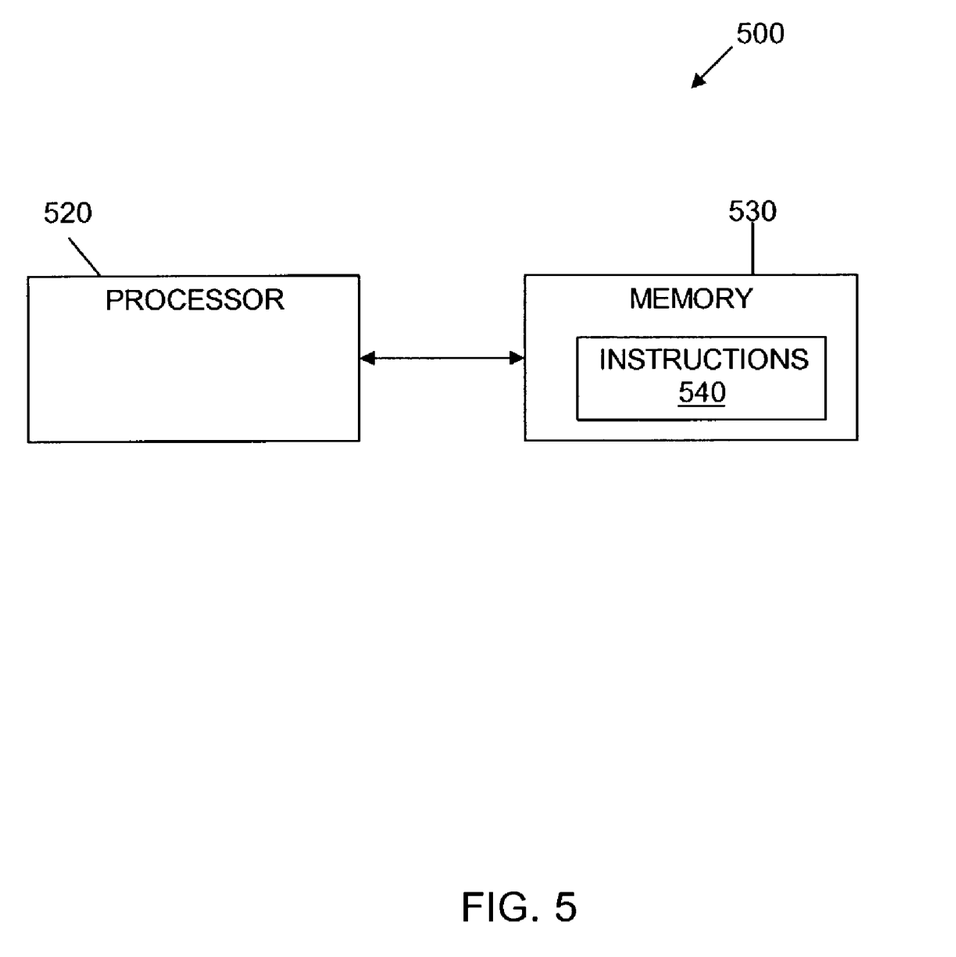
FIG. 5 is a block diagram of one embodiment of a processing system.

FIG. 5 is a block diagram of one embodiment of a processing system. Processing system 500 includes processor 520 and memory 530. Processor 520 can be any type of processor capable of executing software, such as a microprocessor, digital signal processor, microcontroller, or the like. Processing system 500 can be a personal computer (PC), mainframe, handheld device, portable computer, set-top box, or any other system that includes software.

Memory 530 can be a hard disk a floppy disk, random access memory (RAM), read only memory (ROM), flash memory, or any other type of machine medium readable by processor 520. Memory 530 can store instructions 540 for performing the execution of the various method embodiments of the present invention such as methods 200, 300 and 400 (FIGS. 2–4).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of providing power management, the method comprising:
    a virtual machine monitor (VMM) monitoring utilization of a platform device within a computing platform by one or more other virtual machines;
    the VMM identifying a decrease in power available to the computing platform: and
    the VMM managing power consumption of the platform device based on the monitoring upon the identified decrease in available power.

2. The method of claim 1 wherein monitoring further comprises determining resource allocation of the platform device to each of said one or more virtual machines when each of said one or more virtual machines is either started or stopped.

3. The method of claim 1 wherein monitoring further comprises:
identifying a change in operation of said one or more virtual machines; and
determining resource allocation of the platform device to said one or more virtual machines based on the change in operation.

4. The method of claim 1 further comprising notifying a guest operating system before modifying a power consumption state of the platform device.

5. The method of claim 1 wherein the platform device is a power-manageable platform device.

6. The method of claim 1 wherein the platform device is a non-power-manageable platform device.

7. The method of claim 1 further comprising:
observing that one of said one or more virtual machines is quiescent;
saving the state of the one of said one or more virtual machines; and
stopping the one of said one or more virtual machines to free resources allocated to the one of said one or more virtual machines.

8. The method of claim 1 further comprising:
observing that none of said one or more virtual machines is quiescent;
determining which subsets of said one or more virtual machines can remain active without exceeding the power available to the computing platform;
selecting a subset that has a maximum value to a user from the subsets of said one or more virtual machines;
saving the state of each virtual machine that is not included in the subset that has the maximum value to the user; and
stopping said each virtual machine to free resources allocated to said each virtual machine.

9. The method of claim 8 wherein the subset that has the maximum value to the user is selected based on a policy specified by the user.

10. The method of claim 9 further comprising receiving notification of the policy from an application running in one of said one or more VMs.

11. The method of claim 7 further comprising reconstructing the state of said one or more virtual machines upon receiving a resource request from said one or more virtual machines.

12. The method of claim 1 wherein any of said one or more virtual machines runs a guest operating system that lacks the capacity to handle power-management signals sent by a computing platform.

13. The method of claim 12 further comprising:
intercepting a power-management signal sent by the computing platform to the guest operating system; and
preserving the state of a corresponding virtual machine if the power-management signal indicates that the computing platform will be powered down.

14. A system comprising:
a computing platform to implement, at least, a virtual machine monitor (VMM) and one or more virtual machines;
the VMM to monitor utilization of a platform device by said one or more virtual machines, to identify a decrease in power available to the computing platform, and to managepower consumption of the platform device based on the monitoring upon the identified decrease in available power.

15. The system of claim 14 wherein the VMM is to monitor utilization of the platform device by determining resource allocation of the platform device to each of said one or more virtual machines when each of said one or more virtual machines is either started or stopped.

16. The system of claim 14 wherein the VMM is to monitor utilization of the platform device by identifying a change in operation of said one or more virtual machines and determining resource allocation of the platform device to said one or more virtual machines based on the change in operation.

17. An apparatus for providing power management, the apparatus comprising:
a resource watch module to monitor utilization of a platform device within a computing platform by one or more virtual machines; and
a virtual machine monitor (VMM) coupled with the resource watch module, the VMM is to identify a decrease in power available to the computing platform, and to manage power consumption of the platform device based on the monitoring upon the identified decrease in available power.

18. The apparatus of claim 17 wherein the resource watch module is to determine resource allocation of the platform device to each of said one or more virtual machines when each of said one or more virtual machines is either started or stopped.

19. The apparatus of claim 17 wherein the resource watch module is to identify a change in operation of said one or more virtual machines and to determine resource allocation of the platform device to said one or more virtual machines based on the change in operation.

20. The apparatus of claim 17 wherein the VMM is to notify a guest operating system before modifying a power consumption state of the platform device.

21. The apparatus of claim 17 wherein the platform device is a power-manageable platform device.

22. The apparatus of claim 17 wherein the platform device is a non-power-manageable platform device.

23. The apparatus of claim 17 wherein the VMM is to
observe that one of said one or more virtual machines is quiescent;
save the state of the one of said one or more virtual machines; and
stop the one of said one or more virtual machines to free resources allocated to the one of said one or more virtual machines.

24. The apparatus of claim 17 wherein the VMM is to further
observe that none of said one or more virtual machines is quiescent,
determine which subsets of said one or more virtual machines can remain active without exceeding the power available to the computing platform,
select a subset that has a maximum value to a user from the subsets of said one or more virtual machines,
save the state of each virtual machine that is not included in the subset that has the maximum value to the user, and
stop said each virtual machine to free resources allocated to said each virtual machine.

25. The apparatus of claim 24 wherein the subset that has the maximum value to the user is selected based on a policy specified by the user.

26. The apparatus of claim 25 wherein the VMM is to receive a notification of the policy from an application running in one of said one or more VMs.

27. The apparatus of claim 17 wherein any of said one or more virtual machines runs a guest operating system that lacks the capacity to handle power-management signals sent by a computing platform.

28. The apparatus of claim 27 wherein the VMM is to intercept a power-management signal sent by the computing platform to the guest operating system and to preserve the state of a corresponding virtual machine if the power-manageable signal indicates that the computing platform will be powered down.

29. A computer readable medium that provides instructions, which when executed on a processor, cause said processor to perform operations comprising:
   a virtual machine monitor (VMM) monitoring utilization of a platform device within a computing platform by one or more other virtual machines;
   the VMM identifying a decrease in power available to the computing platform; and
   the VMM managing power consumption of the platform device based on the monitoring upon the identified decrease in available power.

30. The computer readable medium of claim 29 providing further instructions causing the processor to perform operations comprising:
   observing that said one or more virtual machines are quiescent;
   saving the state of said one or more virtual machines; and
   stopping said one or more virtual machines to free resources allocated to said one or more virtual machines.

31. The computer readable medium of claim 29 comprising further instructions causing the processor to perform operations comprising:
   intercepting a power-management signal sent by the computing platform to a guest operating system; and
   preserving the state of a corresponding virtual machine if the power-management signal indicates that the computing platform will be powered down.

* * * * *